(12) United States Patent
Allmon et al.

(10) Patent No.: US 6,540,483 B2
(45) Date of Patent: Apr. 1, 2003

(54) METHODS AND APPARATUS FOR BEARING OUTER RACE AXIAL RETENTION

(75) Inventors: Barry Lynn Allmon, Maineville, OH (US); Morris Green Penn, West Chester, OH (US)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 09/939,945

(22) Filed: Aug. 27, 2001

(65) Prior Publication Data

US 2003/0039538 A1 Feb. 27, 2003

(51) Int. Cl.$^7$ ............................................. F01D 29/04
(52) U.S. Cl. ........................ 416/1; 415/174.2; 384/581
(58) Field of Search .......................... 416/1; 415/174.2, 415/110, 111, 113, 170.1, 229; 384/99, 581, 517, 483

(56) References Cited

U.S. PATENT DOCUMENTS

| 4,289,360 | A | 9/1981 | Zirin |
|---|---|---|---|
| 4,687,346 | A | 8/1987 | Suciu |
| 4,872,767 | A | 10/1989 | Knapp |
| 5,247,855 | A | 9/1993 | Alten et al. |
| 5,361,580 | A | 11/1994 | Ciokajlo et al. |
| 6,099,165 | A | 8/2000 | Tremaine |
| 6,261,061 | B1 | 7/2001 | Pfaffenberger |
| 6,443,698 | B1 * | 9/2002 | Corattiyil et al. .............. 416/1 |

* cited by examiner

Primary Examiner—Edward K. Look
Assistant Examiner—James M McAleenan
(74) Attorney, Agent, or Firm—Nathan D. Herkamp; Robert B. Reeser, III; Armstrong Teasdale LLP

(57) ABSTRACT

A bearing assembly for a gas turbine engine rotor includes a damper bearing configured to support the rotor, a bearing centering sub-assembly configured to position the damper bearing relative to the rotor, and a retainer. The damper bearing includes a frame that defines a bearing bore, an inner race, and an outer race, said inner and outer races within said bearing bore. The bearing centering apparatus sub-assembly includes a plurality of first springs and a plurality of second springs. The retainer is coupled to the bearing housing and is configured to maintain an axial position of the bearing outer race with respect to the support structure.

20 Claims, 3 Drawing Sheets

METHODS AND APPARATUS FOR BEARING OUTER RACE AXIAL RETENTION

BACKGROUND OF THE INVENTION

This application relates generally to gas turbine engine rotor assemblies and, more particularly, to bearing assemblies for gas turbine engine rotor assemblies.

Gas turbine engines typically includes a fan rotor assembly, a compressor, and a turbine. The fan rotor assembly includes a fan including an array of fan blades extending radially outward from a rotor shaft. The rotor shaft transfers power and rotary motion from the turbine to the compressor and the fan, and is supported longitudinally with a plurality of bearing assemblies. Bearing assemblies support the rotor shaft and typically include rolling elements located within an inner race and an outer race.

Additionally, at least some known bearing assemblies include a plurality of identical springs attached to the bearing outer race. The springs are spaced equally in a single row that extends circumferentially around the rotor shaft to provide radial stiffness to the bearing and to center the outer race with respect to the support frame. A first end of the springs is attached to the bearing assembly outer race, and a second end of the springs is attached to a flange coupled to a support frame.

During operation, an unbalance within the engine may cause the engine rotor shaft to displace radially. The radial displacements of the shaft are transmitted to the bearing assembly and may cause the bearing outer race to orbit within the support frame. The rotation of the outer race may cause the springs to fail in bending. After spring failure, the outer race is not axially retained, and axial movement of the outer race may permit the rotor to inadvertently contact the support frame, and may cause unpredictable static radial loads to be transmitted to the fan rotor assembly, and dynamic radial loads to be transmitted to the support structure.

BRIEF DESCRIPTION OF THE INVENTION

In one aspect of the invention, a bearing assembly for a gas turbine engine rotor is provided. The bearing assembly includes a damper bearing configured to support the rotor, a bearing centering sub-assembly configured to position the damper bearing relative to the rotor, and a retainer. The damper bearing includes a frame that defines a bearing bore, an inner race, and an outer race, said inner and outer races within said bearing bore. The bearing centering apparatus sub-assembly includes a plurality of first springs and a plurality of second springs. The retainer is coupled to the bearing housing and is configured to maintain an axial position of at least one of the bearing inner race and the bearing outer race.

In another aspect, a method for reducing dynamic loading of a gas turbine engine rotor assembly is provided. The engine includes a rotor shaft, a support frame, and a bearing assembly including a bearing centering sub-assembly and a damper bearing. The bearing centering sub-assembly includes a plurality of first springs and a plurality of second springs. The method includes supporting the rotor shaft on the support frame with the bearing assembly, coupling the bearing centering sub-assembly first spring to the bearing assembly second spring such that the each of the first springs is radially aligned with respect to each of the second springs, and operating the gas turbine engine such that radial forces within the rotor shaft are transmitted through the bearing centering sub-assembly to the support frame.

In a further aspect, a rotor assembly including a rotor shaft, a support frame, a bearing assembly, and a retainer is provided. The support frame defines a bearing bore. The bearing assembly is configured to support the rotor shaft on the support frame such that dynamic loads to the support frame are reduced. The bearing assembly includes a bearing centering sub-assembly, a damper bearing, and a retainer. The bearing centering sub-assembly is configured to position the bearing relative to the rotor shaft. The bearing centering sub-assembly includes a plurality of first springs and a plurality of second springs. Each of said first springs radially aligned with respect to each of the second springs. The damper bearing includes an inner race and an outer race. The inner and outer races are within the support frame bore. The retainer is coupled to the support frame and is configured to maintain an axial position of at least one of the bearing inner race and the bearing outer race relative to the support frame.

DETAILED DESCRIPTION OF THE INVENTION

Figure 1:
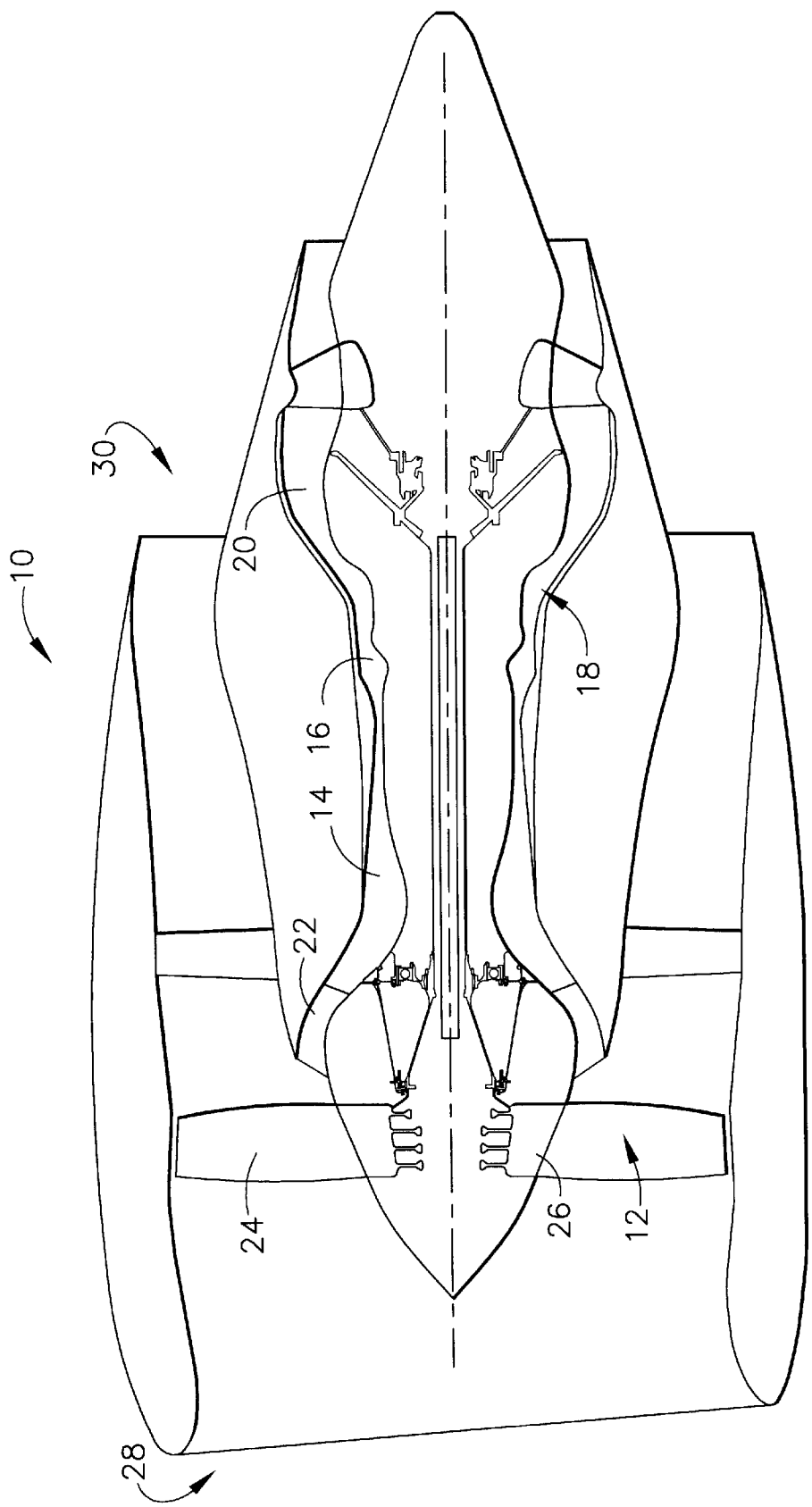
FIG. 1 is schematic illustration of a gas turbine engine.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12.

Figure 2:
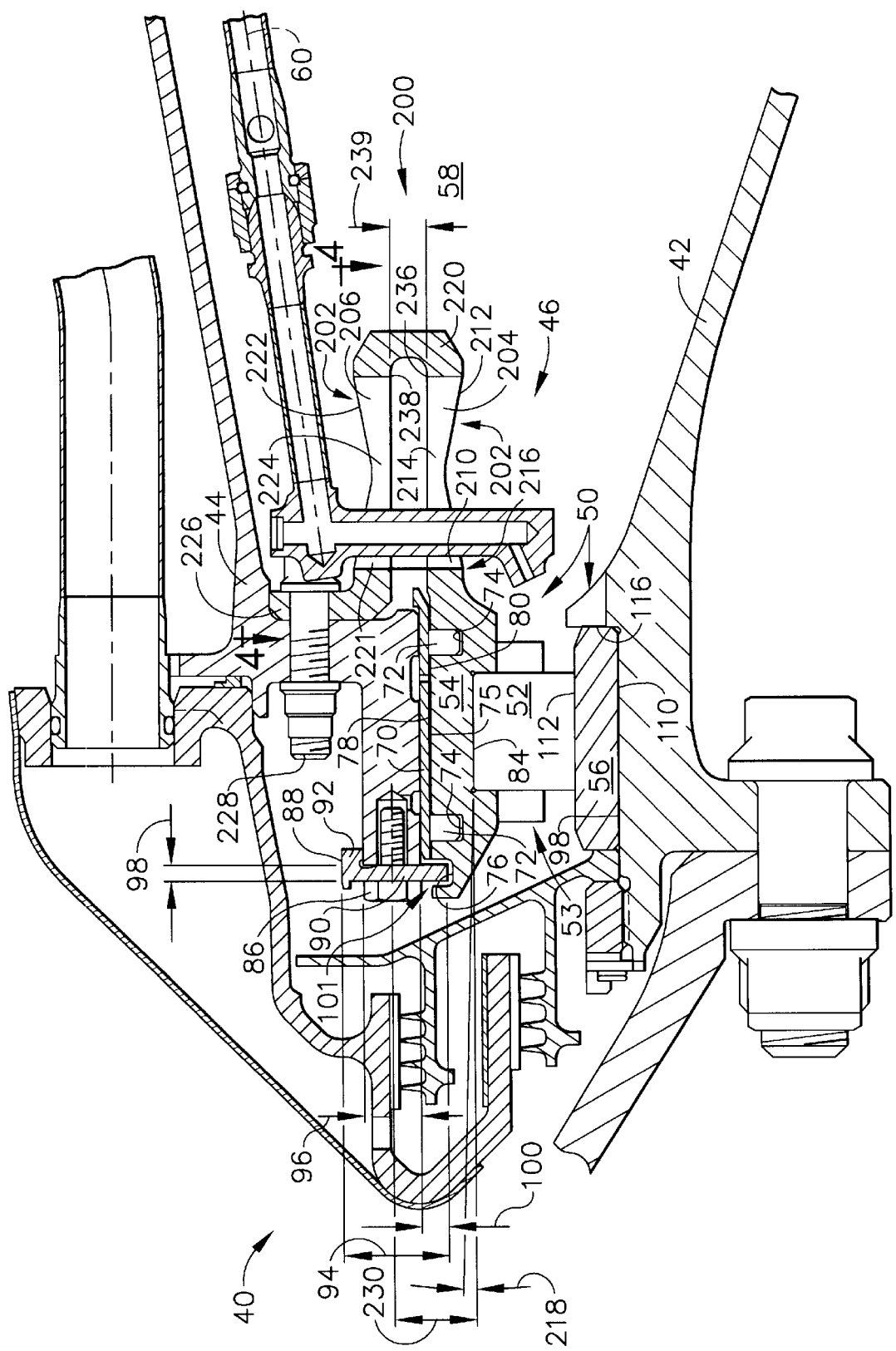
FIG. 2 is a cross-sectional view of an exemplary embodiment of a rotor assembly used in the gas turbine engine shown in FIG. 1.

FIG. 2 is a cross-sectional view of an exemplary embodiment of a rotor and bearing assembly 40 that may be used with a gas turbine engine, such as engine 10 shown in FIG. 1. In one embodiment, the gas turbine engine is a GE90 available from General Electric Company, Cincinnati, Ohio. Rotor and bearing assembly 40 includes rotor disc 26 (shown in FIG. 1) and a rotor shaft 42 which supports an array of fan blades 24 (shown in FIG. 1) that extend radially outward from rotor disc 26. Rotor shaft 42 is rotatably secured to a structural support frame 44 with a plurality of bearing assemblies 46 that support rotor shaft 42. In one embodiment, bearing assembly 46 is a fan roller bearing, and is known as an engine number one bearing. In an alternative embodiment, bearing assembly 46 is a fan thrust bearing (not shown).

In an exemplary embodiment, each bearing assembly 46 includes a paired race 50 and a rolling element 52, positioned within a bearing bore 53 defined by frame 44. In one embodiment, bearing assembly 46 is a damper bearing. Paired race 50 includes an outer race 54 and an inner race 56 radially inward from outer race 54. Rolling element 52 is located between inner race 56 and outer race 54. Bearing assembly 46 is enclosed within a bore within a sealed annular compartment 58 radially bounded by rotor shaft 42 and bearing support 44.

Support frame 44 includes an annular support sleeve 70 and a plurality of rings 72 sized to be received within a plurality of grooves 74 defined within outer race 54. More specifically, outer race 54 includes a pair of grooves 74 that receive rings 72, and a separate groove 76 that is upstream from grooves 74. Grooves 74 and 76 extend radially inward from an outer surface 78 of outer race 54. Outer race 54 is positioned such that a gap 80 is defined between race 54 and annular support sleeve 70. A face 84 of outer race 54 receives rolling element 52 in rollable contact.

Bearing outer race 54 is coupled to support frame 44 by a fastener 86 and a retainer 88. Retainer 88 includes an annular body 90 and a shoulder 92. Retainer annular body 90 has a width 94 that is wider than a thickness 96 of support frame 44 adjacent outer race 54. Accordingly, because retainer annular body width 94 is larger than frame thickness 96, retainer 88 extends a distance 100 radially inward from frame 44 towards outer race 54. More specifically, because retainer annular body 90 has a thickness 98 that is thinner than a width of outer race groove 76, retainer 88 extends from frame 44 into groove 76, such that an axial clearance 101 is defined between retainer 88 and frame 44. Retainer shoulder 92 extends radially downstream from annular body 90 and contacts frame 44. In one embodiment, shoulder 92 is known as an anti-rotation shoulder.

Fastener 86 extends through retainer 88 to couple retainer 88 to support frame 44. In one embodiment, fastener 86 is a threaded bolt. Because retainer 88 extends radially into outer race groove 76, fastener 86 also functions to maintain, as described in more detail below, outer race 54 coupled to support frame 44.

Inner race 56 includes an inner surface 110 and a face 112 that receives rolling element 52 in rollable contact. Inner race 56 is secured within a recess 116 in shaft 42 such that inner race inner surface 110 is adjacent recess 116.

A bearing centering sub-assembly 200 positions bearing assembly 46 within rotor assembly 40. More specifically, bearing centering sub-assembly 200 centers outer race 54 within bearing assembly 46. Bearing centering sub-assembly 200 includes a plurality of springs 202 that extend circumferentially around engine 10. More specifically, bearing centering sub-assembly 200 includes a plurality of first springs 204 and a plurality of second springs 206. First springs 204 and 206 extend circumferentially around engine 10 in rows (not shown in FIG. 2).

Each bearing centering sub-assembly first spring 204 includes a forward end 210, an aft end 212, and a body 214 extending therebetween. Each first spring forward end 210 is coupled to a downstream side 212 of outer race 54, such that first spring body 214 extends downstream from outer race 54. More specifically, each first spring 204 is attached a radial distance 218 outward from rolling element 52. Each first spring aft end 212 is coupled to an annular elbow 220 downstream from bearing assembly 46 within sealed annular compartment 58.

Each bearing centering sub-assembly second spring 206 includes a forward end 221, an aft end 222, and a body 224 extending therebetween. Each second spring forward end 221 includes a flange 226 that is coupled to support frame 44 with a fastener 228, such that second spring body 224 extends downstream from support frame 44. Additionally, as fastener 228 secures flange 226 to support frame 44, outer race 54 is then secured in position to support frame 44.

Each bearing centering sub-assembly second spring 206 is attached a radial distance 230 outward from rolling element 52. Radial distance 230 is greater than radial distance 218. Each second spring aft end 222 is coupled to annular elbow 220 downstream from bearing assembly 46 within sealed annular compartment 58, such that annular elbow 220 extends between bearing centering sub-assembly springs 204 and 206.

Bearing centering sub-assembly first and second spring bodies 214 and 224 each include an inner surface 236 and 238, respectively. Because each surface 236 and 238 is substantially planar, and because spring bodies 214 and 224 are substantially parallel, a distance 239 between bearing centering sub-assembly springs 204 and 206 remains substantially constant.

During engine operation, in the exemplary embodiment, an unbalance of engine 10 may cause high radial forces to be applied to fan assembly 12 (shown in FIG. 1) and bearing assembly 46. More specifically, during engine operation high rotor deflection may induce radial movement of outer race 54. During engine operation, retainer 88 only contacts frame 44 and fastener 86, and as such, axial clearance 101 is maintained between retainer 88 and frame 44. The radial force is transmitted to support frame 44 through bearing centering sub-assembly 200. More specifically, as outer race 54 is forced radially outward as a result of rotor deflection, because bearing centering sub-assembly first spring 204 is attached to outer race 54, the radial movement is transmitted to bearing centering sub-assembly first spring 204.

During operation of engine 10, due to damper radial clearance, a high unbalance may cause outer race 54 to orbit within support frame 44. The orbiting produces a torque through springs 204 and 206 called harmonic drive. The torque is proportional to the radial load and coefficient of the mating surfaces. At radial loads less than one fan blade out, the torque may cause springs 204 and 206 to fail in bending. More specifically, springs 204 and 206 may fail in bending as a result of continued orbiting of outer race 54 within bore 53.

After spring failure, retainer 88 will contact outer race 54 to maintain an axial position of outer race 54 with respect to frame 44. Retainer 88 will still permit outer race 54 to orbit within bore 53 and will not resist torque loading. More specifically, retainer 88 will maintain an axial position of outer race 54 such that radial loading from rotor 40 is still transmitted into frame 44. Furthermore, retainer shoulder 92 prevents fastener 86 from rotating and inadvertently unthreading or uncoupling from frame 44. Accordingly, because axial movement of outer race 54 is facilitated to be reduced, inadvertent contact between rotor shaft 42 and frame 44 is facilitated to be prevented post spring failure. As a result, retainer 88 facilitates extending a useful life of bearing assembly 40 in a cost-effective and reliable manner.

Figure 3:
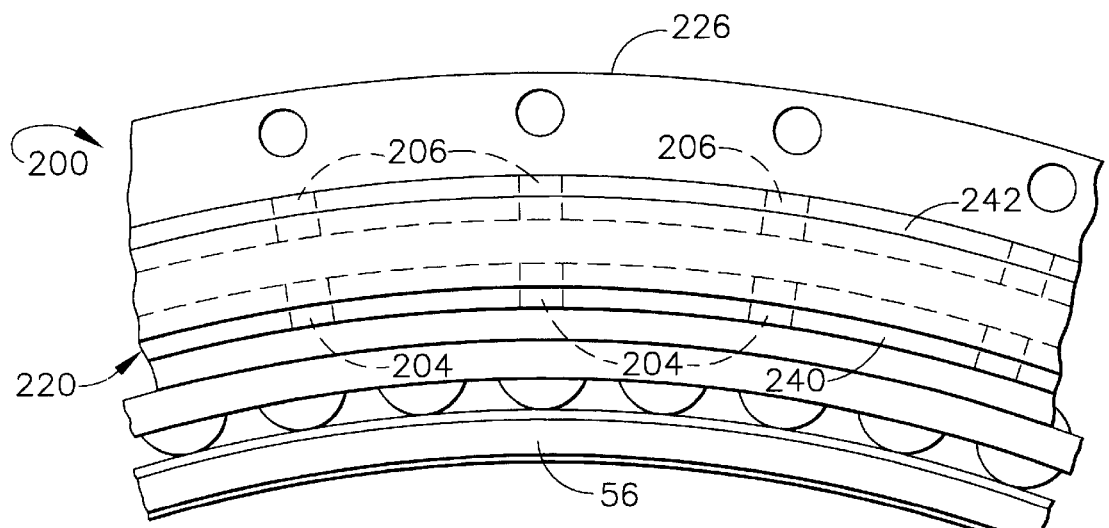
FIG. 3 is a partial end view of a bearing centering sub-assembly used with the rotor assembly shown in FIG. 2.
Figure 4:
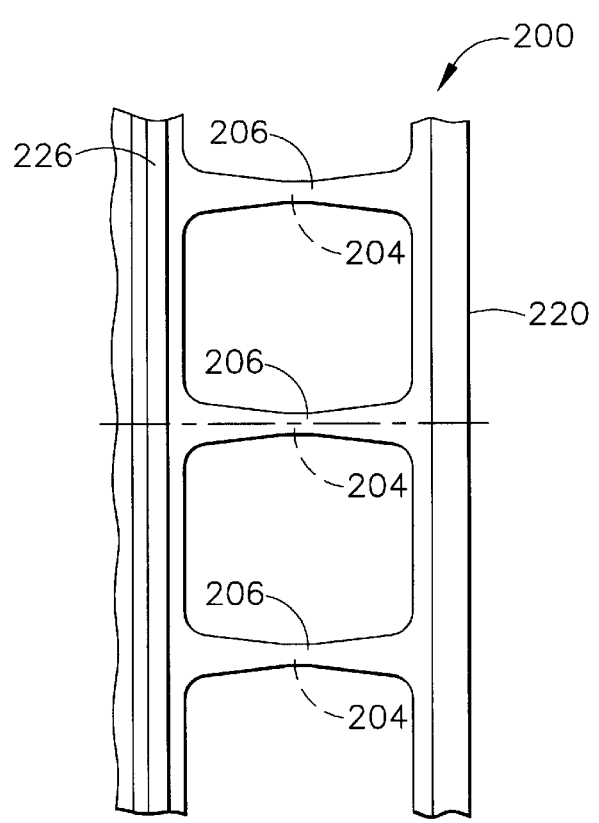
FIG. 4 is a radial view of the bearing centering sub-assembly shown in FIG. 3.

FIG. 3 is a partial end view of bearing centering sub-assembly 200. FIG. 4 is a top view of bearing centering sub-assembly 200. Bearing centering sub-assembly first springs 204 and second springs 206 extend circumferentially around engine 10 (shown in FIGS. 1 and 2) in rows 240 and 242, respectively. Additionally, because each row 240 and 242 of springs 204 and 206, respectively, is coupled with annular elbow 220, springs 204 and 206 are sometimes referred to as serially connected or doubled back, and in a hair-pin arrangement.

More specifically, bearing centering sub-assembly springs 204 and 206 are oriented circumferentially such that each first spring 204 is radially aligned with respect to each second spring 206, as shown in FIG. 4. As a result, when bearing centering sub-assembly 200 is not anti-rotated, both springs 204 and 206 yield in bending and reduce in length by an equal amount when circumferential force is transmitted to bearing centering sub-assembly 200. Circumferential force is created when rotor unbalance loads are significant such that the radial gap between race 54 and support sleeve 70 is diminished or bottomed. This results in a net axial translation or displacement of rolling elements 52 on bearing inner race surface 112 equal approximately zero. As a result, because the net axial translation or displacement is approximately zero, retainer 88 may be fabricated such that retainer annular body thickness 98 does not need to withstand high axial loading.

The above-described rotor assembly is cost-effective and highly reliable. The rotor assembly includes a retainer that includes an anti-rotational shoulder. Following bearing centering sub-assembly spring failure, the retainer maintains an axial position of the outer race relative to the support frame. Accordingly, radial loading is still transmitted into the frame, and inadvertent contact between the rotor shaft and the frame is prevented. As a result, the retainer facilitates extending a useful life of the bearing assembly when the engine is operating in a damaged condition.

While the invention has been described in terms of various specific embodiments, those skilled in the art will recognize that the invention can be practiced with modification within the spirit and scope of the claims.

What is claimed is:

1. A method for reducing dynamic loading of a gas turbine engine rotor assembly, the engine including a rotor shaft, a support frame, and a bearing assembly including a bearing centering sub-assembly and a damper bearing, the bearing centering sub-assembly including a plurality of first springs and a plurality of second springs, said method comprising:

supporting the rotor shaft on the support frame with the bearing assembly;

coupling the bearing centering sub-assembly first spring to the bearing assembly second spring such that the each of the first springs is radially aligned with respect to each of the second springs; and operating the gas turbine engine such that radial forces within the rotor shaft are transmitted through the bearing centering sub-assembly to the support frame; and coupling a retainer to the bearing assembly to maintain an axial position of the at least one of the bearing.

2. A method in accordance with claim 1 wherein the bearing centering sub-assembly further includes an annular elbow, and wherein coupling the bearing centering sub-assembly further comprises the steps of:

coupling the bearing centering sub-assembly first spring between the bearing and the annular elbow; and coupling the bearing centering sub-assembly second spring between the support frame and the annular elbow.

3. A method in accordance with claim 1 wherein coupling the bearing centering sub-assembly further comprises the steps of:

coupling the bearing centering sub-assembly first spring a first radial distance from the damper bearing; and coupling the bearing centering sub-assembly second spring a second radial distance from the damper bearing, such that the second radial distance is greater than the first radial distance.

4. A method in accordance with claim 1 wherein said step of coupling the bearing centering sub-assembly further comprises coupling the bearing centering sub-assembly first spring to the bearing centering sub-assembly second spring, such that the first spring and the second spring are deflected an identical distance when subjected to radial force.

5. A method in accordance with claim 1 wherein operating the gas turbine engine further comprises the step of operating the gas turbine engine such that radial forces within the rotor shaft are transmitted through the bearing centering sub-assembly first spring to the bearing centering sub-assembly second spring.

6. A bearing assembly for a gas turbine engine rotor, said bearing assembly comprising:

a damper bearing configured to support the rotor, said damper bearing comprising a frame defining a bearing bore, an inner race, and an outer race, said inner and outer races within said bearing bore;

a bearing centering sub-assembly configured to position said damper bearing relative to the rotor, said bearing centering apparatus sub-assembly comprising a plurality of first springs and a plurality of second springs, each of said first springs radially aligned with respect to each of said second springs; and a retainer coupled to said bearing housing and configured to maintain an axial position of at least one of said bearing inner race and said bearing outer race.

7. A bearing assembly in accordance with claim 6 wherein said plurality of said second springs are a first radial distance from said bearing, said plurality of said first springs are a second radial distance from said bearing, said second radial distance greater than said first radial distance.

8. A bearing assembly in accordance with claim 6 wherein each of said plurality of first springs connected to each of said second springs.

9. A bearing assembly in accordance with claim 6 wherein said retainer coupled to said damper bearing by a fastener, said retainer further configured to facilitate preventing said fastener from uncoupling from said damper bearing.

10. A bearing assembly in accordance with claim 6 wherein said retainer coupled to said damper bearing by a fastener, said retainer comprises a shoulder configured to contact said bearing housing to prevent said fastener from rotating.

11. A bearing assembly in accordance with claim 6 wherein said bearing outer race comprises a groove, said retainer coupled to said damper bearing by a fastener such that at least a portion of said retainer extends into said outer race groove.

12. A bearing assembly in accordance with claim 6 wherein said retainer facilitates transmitting radial loads from the engine rotor to said housing.

13. A rotor assembly comprising:

a rotor shaft;

a support frame defining a bearing bore; and a bearing assembly configured to support said rotor shaft on said support frame such that dynamic loads to said support frame are reduced, said bearing assembly comprising a bearing centering sub-assembly, a damper bearing, and a retainer, said bearing centering sub-assembly configured to position said bearing relative to said rotor shaft, said bearing centering sub-assembly comprising a plurality of first springs and a plurality of second springs, each of said first springs radially aligned with respect to each of said second springs, said damper bearing comprising an inner race and an outer race, said inner and outer races within said bearing bore; said retainer coupled to said support frame and configured to maintain an axial position of at least one of said bearing inner race and said bearing outer race relative to said support frame.

14. A bearing assembly in accordance with claim 13 wherein said bearing centering sub-assembly plurality of said second springs are a first radial distance from said damper bearing, said bearing centering sub-assembly plurality of said first springs are a second radial distance from said damper bearing.

15. A bearing assembly in accordance with claim 14 wherein said second radial distance greater than said first radial distance.

16. A bearing assembly in accordance with claim 14 wherein at least one of said bearing outer race and said bearing inner race comprises a groove, said retainer coupled to said bearing by a fastener such that at least a portion of said retainer extends into at least one of said bearing outer and inner race groove.

17. A bearing assembly in accordance with claim 14 wherein said retainer coupled to said damper bearing by a fastener, said retainer further configured to facilitate preventing said fastener from uncoupling from said damper bearing.

18. A bearing assembly in accordance with claim 14 wherein said retainer coupled to said damper bearing by a fastener, said retainer comprises a shoulder configured to contact said support frame to prevent said fastener from rotating, said plurality of first springs connected to said plurality of second springs.

19. A bearing assembly in accordance with claim 14 wherein said retainer facilitates transmitting radial loads from the engine rotor to said support frame.

20. A bearing assembly in accordance with claim 14 wherein said bearing centering sub-assembly plurality of first springs and plurality of second springs deflect an identical distance when subjected to radial force.

* * * * *

UNITED STATES PATENT AND TRADEMARK OFFICE
CERTIFICATE OF CORRECTION

PATENT NO.    : 6,540,483 B2
DATED         : April 1, 2003
INVENTOR(S)   : Allmon et al.

It is certified that error appears in the above-identified patent and that said Letters Patent is hereby corrected as shown below:

Column 5,
Line 39, delete "such that the" and insert therefor -- such that --.
Line 46, delete "at least one of the".

Signed and Sealed this

Twenty-ninth Day of July, 2003

JAMES E. ROGAN
*Director of the United States Patent and Trademark Office*